United States Patent [19]

Wallmann et al.

[11] 4,232,577

[45] Nov. 11, 1980

[54] APPARATUS FOR LONGITUDINALLY CUTTING WEBS OF MATERIAL

[75] Inventors: Wilfried Wallmann, Lengerich of Westphalia; Manfred Menzel, Lengerich-Hohne; Dieter Peschel, Lienen-Holzhausen, all of Fed. Rep. of Germany

[73] Assignee: Windmoller & Holscher, Lengerich of Westphalia, Fed. Rep. of Germany

[21] Appl. No.: 9,175

[22] Filed: Feb. 2, 1979

[30] Foreign Application Priority Data

Feb. 8, 1978 [DE] Fed. Rep. of Germany ....... 2805211

[51] Int. Cl.[3] ......................... B23D 19/06; B26D 1/24

[52] U.S. Cl. ........................................ 83/496; 83/482; 83/497; 83/499

[58] Field of Search ................. 83/497, 496, 482, 480, 83/499, 500, 508.3

[56] References Cited

U.S. PATENT DOCUMENTS

| | | | |
|---|---|---|---|
| 559,179 | 4/1896 | Koegel | 83/497 |
| 2,554,027 | 5/1951 | Haswell | 83/482 |
| 2,792,889 | 5/1957 | Kusel | 83/482 |
| 3,186,282 | 6/1965 | Waterhouse | 83/497 |

FOREIGN PATENT DOCUMENTS

| | | | |
|---|---|---|---|
| 447854 | 8/1927 | Fed. Rep. of Germany | 83/496 |

*Primary Examiner*—Donald R. Schran
*Attorney, Agent, or Firm*—Fleit & Jacobson

[57] ABSTRACT

In a slitting apparatus for a web of material such as paper, comprising a circular knife which, in its operation position, co-operates with one of a plurality of counter-blades defined at the periphery of a grooved roller, the rotary axis of the knife in the operative position of the latter is inclined at an acute angle to the roller axis.

6 Claims, 3 Drawing Figures

APPARATUS FOR LONGITUDINALLY CUTTING WEBS OF MATERIAL

The invention relates to an apparatus for longitudinally cutting webs of material, especially paper webs, comprising a freely rotatably mounted circular knife which can be applied to cutting edges of a grooved backing roller defining the counter-knife.

In a cutting apparatus of this kind known, for example, from DE-AS No. 10 70 018, it is not possible, while the web of paper or like material such as cellulose (cellophane) is moving, to set a different cutting width by lifting the cutting knife off the counter-knife, displacing it by one or more divisions in the axial direction, and re-applying it to the cutting edge of the new counter-knife in the appropriate groove of the backing roller without the danger of the web tearing or becoming damaged. In the known cutting apparatus, therefore, the web must always be first stopped to enable the cutting knife to be brought to the new position. Only after the new cutting width has been set can the web be restarted.

The problem of the present invention is to provide a cutting apparatus of the aforementioned kind in which the cutting knife can, whilst the web is moving, be shifted from one cutting width to the other without the web tearing.

According to the invention, this problem is solved in that in the cutting position the rotary axis of the circular knife is inclined to the axis of the counter-knife by an angle of incidence. Surprisingly, it has been found that such an inclination of the circular knife effectively prevents tearing of the moving web to be cut whilst the circular knife is being displaced.

An angle of incidence of the circular knife to the counter-knife of 15° has proved advantageous.

One example of the invention will now be described in more detail with reference to the drawing, wherein.

Figure 3:
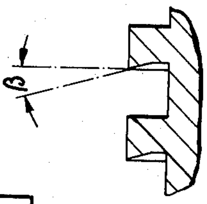
FIG. 3 is an enlarged detail of the grooves of the backing roller defining the counter-knives.
Figure 2:
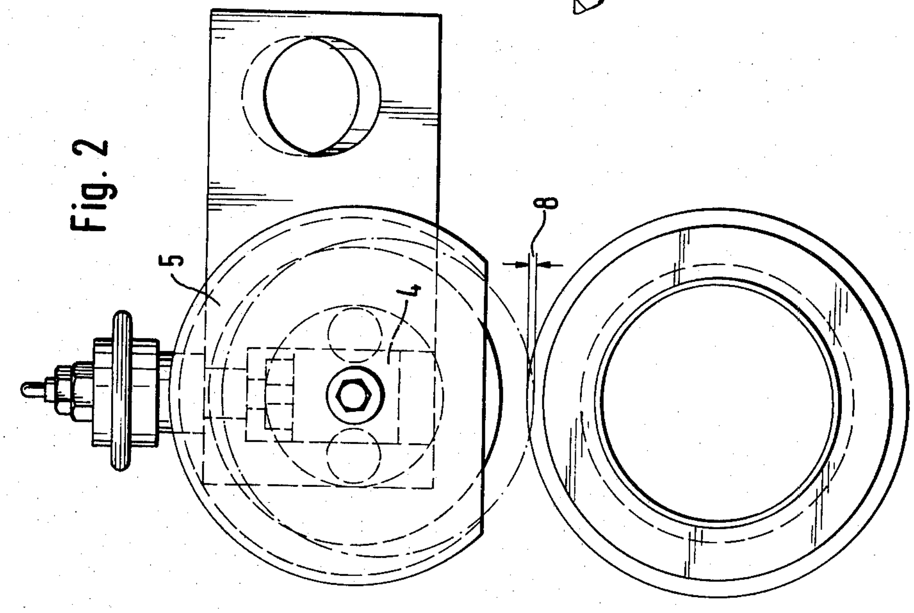
FIG. 2 is a side elevation of the FIG. 1 apparatus.
Figure 1:
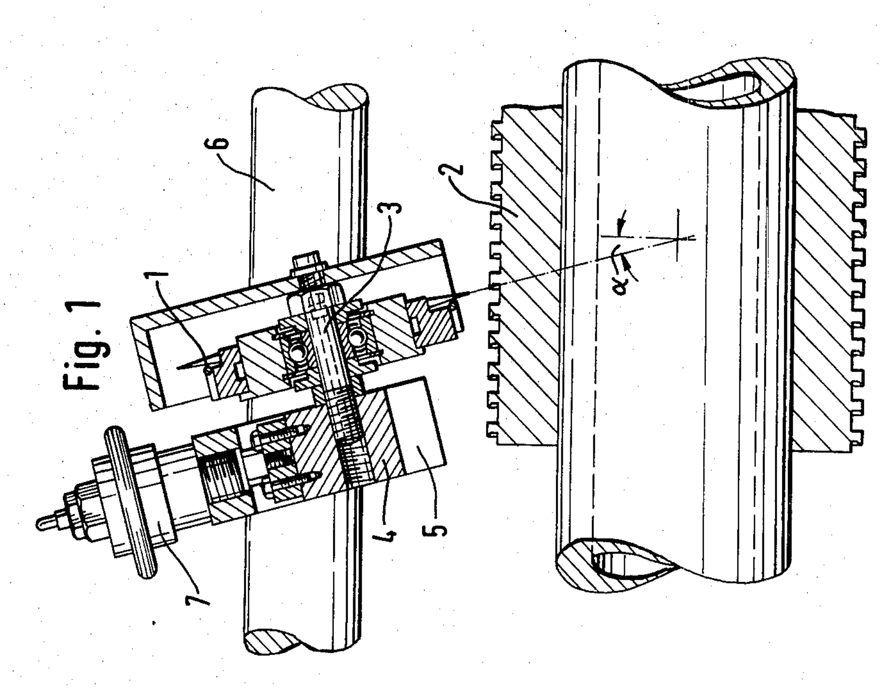
FIG. 1 is a section through the cutting apparatus, wherein the inclined cutting knife is shown in a retracted position from the grooved backing roller for the sake of clarity.

According to the longitudinal section of FIG. 1, a cutting knife 1 is disposed opposite a rotary counter-knife 2 at an angle $\alpha$ of 15°. The web to be severed runs over the counter-knife. The cutting knife 1 is freely rotatably mounted on a shaft 3 secured to a readily displaceably mounted link 4 which is a slide fit in a housing 5 and inclined at the same angle of 15° to the counter-knife 2.

The housing 5 is displaceable on and can be secured in an adjusted position to a shaft 6 which is fixed with respect to the frame. A piston-cylinder unit 7 secured to the housing 5 has its piston rod rigidly connected to the link 4. By actuating the piston cylinder unit 7, the cutting knife 1 can be brought into and out of engagement with the counter-knife 2. The cutting edge of the cutting knife 1 is directed towards the cutting edge of the counter-knife 2 and is aligned with its ground relief $\beta$. For the purpose of cutting, the cutting knife 1 projects into the generated surface of the counter-knife 2 by a depth 8 of about 1.5 mm. In addition, it is ensured that the (likewise relief ground) cutting knife 1 touches the generated surface at two points and receives a bias with respect to the counter-knife 2; in the prior art this has to be done by means of special springs or by biassing the position of the cutting knife.

We claim:

1. Apparatus for longitudinally cutting webs of material, especially paper webs, comprising a freely rotatably mounted circular knife which can be applied to cutting edges of a grooved backing roller defining the counter-knife, characterised in that in the cutting position the circular knife (1) is inclined to the axis of the counter-knife (2) by an angle of incidence ($\alpha$), and characterised in that the circular knife is disengageable from the counter-knife by movement in the direction of the angle of incidence ($\alpha$) so that the width of cut is changeable during movement of a web to be cut.

2. Apparatus according to claim 1, characterised in that the angle of incidence ($\alpha$) is 15°.

3. Apparatus for longitudinally cutting webs of material, especially paper webs, comprising:

a grooved backing roller having an axis and defining a counter-knife with cutting edges;

a shaft spaced from and inclined to the axis of the counter-knife;

a circular knife freely rotatably mounted on said shaft and inclined to the axis of the counter-knife by an angle of incidence ($\alpha$);

link means for supporting said shaft; and means for moving said link means in a direction perpendicular to the angle of incidence ($\alpha$) so that said circular knife is moved between a cutting position in which said circular knife engages a cutting edge of said counter knife and a position spaced from said circular knife.

4. Apparatus according to claim 3, further comprising:

a second shaft parallel to and spaced from the axis of said backing roller; and a housing mounted on said second shaft for longitudinal movement with respect thereto, said link means being displaceably mounted in said housing so that the width of a cut is changeable by moving said circular knife from said cutting position to said spaced position and by changing the position of said housing on said second shaft.

5. An apparatus according to one of claims 3 or 4, wherein said circular knife is ground in such manner that said knife contacts said cutting edge of said counter-knife at two points.

6. An apparatus according to one of claims 3 or 4, wherein the angle of incidence ($\alpha$) is 15°.

* * * * *